United States Patent [19]

Encaoua

[11] Patent Number: 5,073,704
[45] Date of Patent: Dec. 17, 1991

[54] MULTICHANNEL OPTICAL AIMING AND SURVEYING METHOD AND APPARATUS HAVING A FIELD POSITION SPOTS CORRESPONDENCE TABLE

[75] Inventor: Serge Encaoua, Clichy, France

[73] Assignee: Societe d'Applications Generales d'Electricite et de Mecanique Sagem, Cedex, France

[21] Appl. No.: 541,312

[22] Filed: Jun. 21, 1990

[30] Foreign Application Priority Data

Jun. 22, 1989 [FR] France ............................... 89 08333

[51] Int. Cl.$^5$ .............................................. G01J 1/20
[52] U.S. Cl. .................................. 250/201.1; 356/152
[58] Field of Search ................ 250/207.1, 203.3, 561; 356/141, 152

[56] References Cited

U.S. PATENT DOCUMENTS

| | | | |
|---|---|---|---|
| 4,173,414 | 11/1979 | Vauchy et al. ...................... | 356/141 |
| 4,277,169 | 7/1981 | Krieg .................................. | 356/141 |
| 4,975,565 | 12/1990 | Schmidt et al. ..................... | 356/152 |

*Primary Examiner*—David C. Nelms
*Assistant Examiner*—Que T. Le
*Attorney, Agent, or Firm*—Larson & Taylor

[57] ABSTRACT

An optical sighting and aiming apparatus has a first channel having a display unit provided with deviation measurement means; a second channel having a sighting member and a light deviator for angularly deviating the optical axis of the sighting member with respect to a reference direction harmonized with the center of the vision field of the display unit; and an aiming mirror inserted in a light path common to the two channels, at a location between the portions of the two channels which are separate and a multichannel collimator for adjusting the angular direction of both channels with respect to a scene being observed. The second or aiming channel further comprises a separator for separating a light beam from the multichannel collimator into a beam directed toward the sighting member and a beam directed toward a zeroing detector harmonized with the sighting member. A memory stores a correspondence table between coordinates of spots located in the field of the display unit, as provided by the deviation measuring means, and signals to be delivered to the deviator for aligning an axis of the sighting member with the respective spots. The correspondence is determined from signals delivered by the deviation measuring means, by encoding means operatively associated to the deviating means and by an output signal of the zeroing detector.

4 Claims, 1 Drawing Sheet

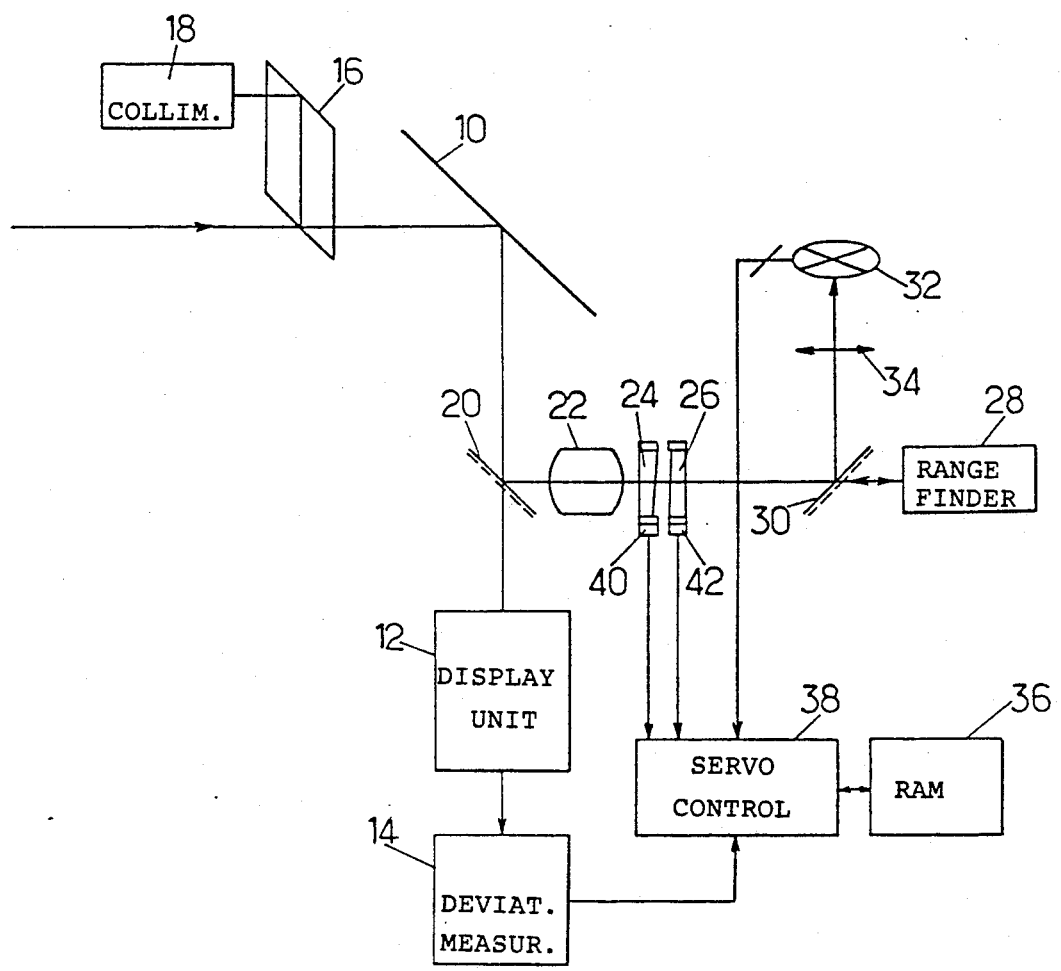

MULTICHANNEL OPTICAL AIMING AND SURVEYING METHOD AND APPARATUS HAVING A FIELD POSITION SPOTS CORRESPONDENCE TABLE

BACKGROUND OF THE INVENTION

The present invention relates to optical surveying and aiming. It particularly relates to apparatus of the type comprising at least: a first channel having a display unit provided with deviation measurement means; a second channel having a sighting unit and light deviating means for angularly deviating the optical axis of the sighting unit with respect to a reference direction harmonized with the center of the vision field of the display unit; and an aiming mirror inserted in a path common to the two channels (and possibly to other further channels) for modifying the orientation of these channels with respect to a scene observed. It also relates to aiming methods using apparatus of this type. The display unit is often a camera working in the visible range, an infrared camera or a telescope.

PRIOR ART

Apparatus of the above-defined type are known comprising a multichannel collimator which can be substituted for the scene; the aiming mirror may be placed so as to be able to modify the orientation of the optical axis of the collimator with respect to all channels.

The light deviating means used in practice, such as diasporameters or mirror sets, are far from having a perfectly linear response; the display units exhibit geometric aberrations. Consequently, it is difficult to accurately aim a sighting channel at a point of the scene situated outside the center of the field and whose position is defined with respect to the latter on the display unit. Now, in many cases, it is desirable to control the deviating means by a signal which aims the sighting channel, without trial-and-error, on the reference point in the field. This problem is met with particularly in apparatus in which the sighting channel comprises a laser range finder, which must be instantaneously aimed at a secondary target appearing outside the optical axis of the first channel. Due to the very low amount of divergence of the laser beam, aiming must be accurate. It is often preferable not to modify the field of observation, for example for maintaining a main target in the center thereof.

SUMMARY OF THE INVENTION

It is an object of the invention to provide an aiming method using an apparatus of the above-defined type, which is improved over the prior art methods, particularly in that it permits accurate aiming to be achieved without modification of the observation field, of the display unit in a range of a few degrees at least about the direction toward the center of the observation field. Another object is to the provide an optical apparatus comprising means for implementing such a method.

To this end, a method according to the invention includes the steps of carrying out a preliminary calibration during which, after harmonization of the channels, the control signal to be applied to the deviating means is determined, for several points distributed in the field of the display unit, for aiming the sighting unit at a point in the field of the collimator whose actual position is determined by deviation measurement in the field; constructing a correspondence table between the position of each point in the field and the corresponding control signal of the deviating means; storing the correspondence table or a mathematical table derived therefrom in memory means; and, for aiming in a direction represented by a point in the field which is remote from the center, computing the control signal to be applied to the deviating means by interpolation between the values in the table.

With this method, instantaneous and accurate aiming is possible despite the lack of linearity of the deviating means and/or the display unit. Since the method uses a collimator integrated in the apparatus, calibration may be carried out independently and automatically. It makes it possible to recalibrate the apparatus without difficulty if the display unit or deviating means is replaced.

The invention also provides an optical device of the above-defined type, for implementing the method which has just been described.

The invention will be better understood from the following description of a particular embodiment, given by way of example.

BRIEF DESCRIPTION OF THE DRAWINGS

The accompanying Figure is a simplified diagram of an apparatus according to the invention.

DETAILED DESCRIPTION OF AN EMBODIMENT

Referring to the Figure, the apparatus has a construction which is generally conventional. It comprises an aiming mirror 10 whose characteristics and control mode depend on the nature of the apparatus. Mirror 10 may in particular be a stabilization mirror with motors for orienting it about two orthogonal axes and a control circuit for modifying the direction in the outside space which corresponds to the center of the field of a display unit 12, which may for example be a television camera or a camera operating in the near or far infrared. For implementing the invention, the display unit 12 is associated with deviation measurement means 14 for determining the position of the spot appearing in the field of the unit 12 and for representing the spot, in general with respect to the center of the field, as signals giving its polar or cartesian coordinates.

The apparatus further comprises a multispectral collimator 16 which may have the construction described in European Patent No. 0,251,920. For a reference position of the aiming mirror 10, the multispectral collimator generates a spot in the center of the field of the display unit 12.

In addition to the display channel including unit 12, the apparatus as shown comprises a second or borsighting channel operating in a different wave length range. A dichroic separator 20 splits up the beam from the observed scene or from collimator 18. The radiation in the sensitivity range of the display unit 12 (8 to 12 $\mu$m for example in the case of a thermal camera) is transmitted by separator 20 whereas the radiation in the working range of the second channel is reflected.

As shown, the second channel comprises afocal enlarging lens 22 followed by a deviating means, shown in the form of two rotatable prisms 24 and 26 constituting a diasporameter, and a range finder 28 having a laser delivering monochromatic pulses and a receiver. A dichroic separator plate 30 further splits the radiation reflected by mirror 20 into a beam transmitted to range finder 28 and a beam reflected towards a zeroing detector, shown in the form of a four quadrant cell 32. The laser may in particular deliver pulses having a wave length of 1.06 or 1.54 μm. The dichroic plate is selected to form on the zeroing detector 32, via lens 34, the image of the source point delivered by the multispectral collimator, for example for a wave length of 0.93 μm if the range finder uses a laser having a wave length of 1.54 μm.

The zero detector 32, range finder 28 and mirror 30 are placed so that, when the beam from the multispectral collimator 18 coincides with the center of detector 32, the collimator beam is centered on the laser rang finder. The same result is obtained when the multispectral collimator does not use a source point emitting at the wave length of the laser of range finder 28, but a reflection of this beam, as explained in French patent No. FR 89 05887.

The method according to the invention, when it is used for aiming at a target whose position in the field is remote from the center of the display unit 12, requires a preliminary calibration of the apparatus.

Such calibration requires repeating a sequence of operations and storing the results of all sequences.

Before carrying out the calibration, the two channels are harmonized using a conventional procedure, the aiming mirror 10 being in its reference or nominal position. Such harmonization may be carried out using the diasporameter 24, 26: the angular positions of prisms 24 and 26 for which the harmonization is achieved are delivered, for example by angular encoders 40 and 42, to electronic signal processing means 38 connected to a storage RAM 36.

After the collimator has been substituted for the scene, the following sequence is repeated:
- the aiming mirror 10 is moved with respect to its reference or nominal position so as to generate a collimated spot in the field of the display unit 12;
- the deviation measurement means 14 is used for determining the coordinates (Si, Gi) of the spot with respect to a reference which is generally the center of the field unit 12;
- the coordinates (Si, Gi) are stored in memory 36;
- the deviating means 24, 26 of the laser range finder 28 is actuated until the beam from collimator 18 is aligned with the center of the zero detector 32, namely until the aiming axis of the laser range finder 28 is harmonized with the point of coordinates (Si, Gi) in the field of the sighting unit; when the aiming detector 32 is able to give an indication identifying the direction of the deviation, for example if it is a four quadrant detector, the search for the orientation to be given to prisms 24 and 26 of the deviating means may take place automatically under the control of the electronic servo-control means 38, by actuation of electric motors for rotating prisms 24 and 26;
- the angular position of prisms 24 and 26, delivered by the angular encoders 40, 42 are selected to the coordinates of the point considered in memory 36.

The sequence must in practice be repeated a hundred times at least. Thus there is obtained a table of correspondence between the position of the target in the field of the display unit 12 and the corresponding controlled positions of prisms 24 and 26 of the deviating means. This table or map may be kept as it is. However, it is typically processed to compute, by conventional mathematical modeling techniques, a transcoding matrix which establish a correspondence between the coordinates (Si, Gi) of points distributed evenly in the field to respective controls of the deviating means, formed by the angular positions to be given to prisms 24 and 26.

The calibration table may be stored in a programmable ROM.

When subsequently it is desired to find the range of a target corresponding to a point designated using the coordinates of the selected point on the display unit, which coordinates are delivered by the deviation measuring device 14, the controls to be applied to prisms 24 and 26 may be computed automatically by the electronic means 38 using an interpolation procedure among those conventionally used, for example from a constellation of points of the table surrounding the designated point. Known biquadratic, sine-shaped, etc. interpolation techniques may typically be used.

It can be seen that the invention makes it possible to use a range finder for determining the distance of a target represented by a point remote from the center of the field of the display unit without it being necessary for the display unit and the deviating means to have a high degree of linearity. Furthermore, calibration may take place independently and automatically, making the apparatus again operational a short time after replacement a component.

I claim:

1. An aiming process for use with an optical sighting and aiming apparatus having : a first channel having a display unit provided with deviation measurement means; a second channel having a sighting unit and light deviating means for angularly deviating the optical axis of the sighting unit with respect to a reference direction harmonized with the center of the vision field of the display unit; and an aiming mirror inserted in a light path common to the two channels, at a location between the portions of the two channels which are separate and a multichannel collimator for adjusting the angular direction of both said channels with respect to a scene being observed, comprising the steps of :
    carrying out a preliminary calibration including harmonizing said channels and determining respective control signals to be applied to the deviating means for aiming the sighting unit at a plurality of spots distributed in the field of the display member, the position of said spots being determined by measuring the deviation thereof in the field with said deviation measurement means;
    drawing up a correspondence table between the position of each of said spots in the field and the respective control signal applied to the deviating means;
    storing the correspondence table or a mathematical table derived therefrom in memory means; and,
    for aiming in any direction as represented by a spot in the field which is remote from the center, computing the control signal to be applied to the deviating means by interpolation in the stored table.

2. An apparatus for optical surveying and aiming in a scene, having :
    a first channel having a display unit provided with deviation measurement means;
    a second channel having a sighting unit and light deviating means for angularly deviating the optical axis of the sighting unit with respect to a reference direction harmonized with the center of the vision field of the display unit;

an aiming mirror inserted in a light path common to the two channels, at a location between the portions of the two channels which are separate; and a multichannel collimator for adjusting the angular direction of both said channels with respect to a scene being observed, wherein the second channel further comprises means for separating a light beam from the multichannel collimator into a beam directed toward the sighting unit and a beam directed toward a zeroing detector harmonized with the sighting unit, and the apparatus further comprises memory means for storing a correspondence table between coordinates of spots located in the field of the display unit, as provided by the deviation measuring means, and signals to be delivered to the deviating means for aligning an axis of the sighting unit with the respective spots and electronic signal processing means for determining said correspondence from signals delivered by the deviation measuring means, by encoding means operatively associated to the deviating means and by an output signal of the zeroing detector.

3. Apparatus according to claim 2, wherein said deviating means comprises a diasporameter whose prisms are provided with angular encoders constituting said encoding means.

4. Apparatus according to claim 2, wherein said sighting means comprises a laser range finder having a laser for delivering monochromatic pulses whose wavelength is out of the sensitivity range of the display unit.

* * * * *